March 10, 1959
G. A. MANN
2,876,817
POWER HAYSTACK SAW
Filed June 11, 1957
2 Sheets-Sheet 1
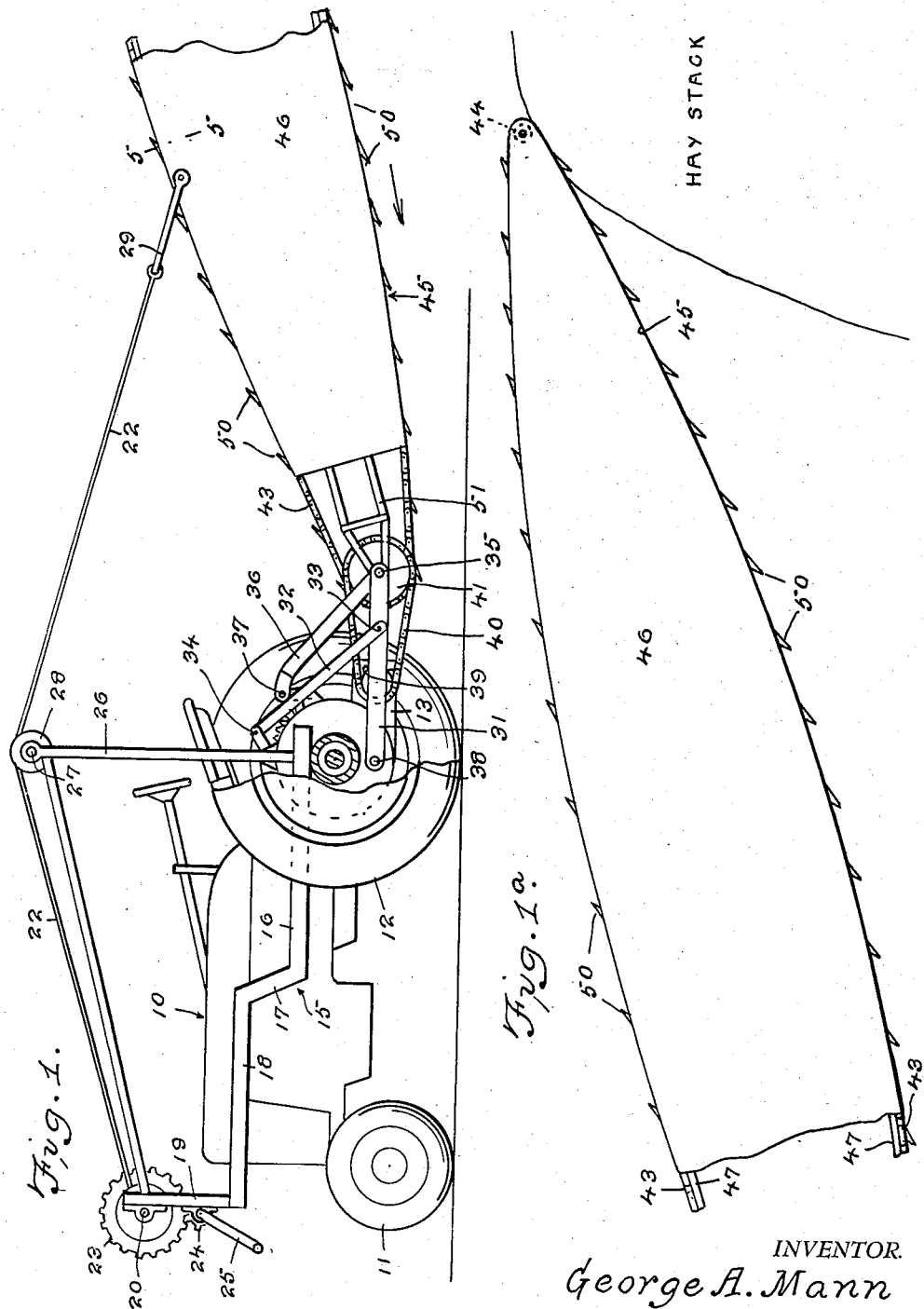
INVENTOR.
George A. Mann
BY Victor J. Evans Heo.
ATTORNEYS March 10, 1959
G. A. MANN
2,876,817
POWER HAYSTACK SAW
Filed June 11, 1957
2 Sheets-Sheet 2
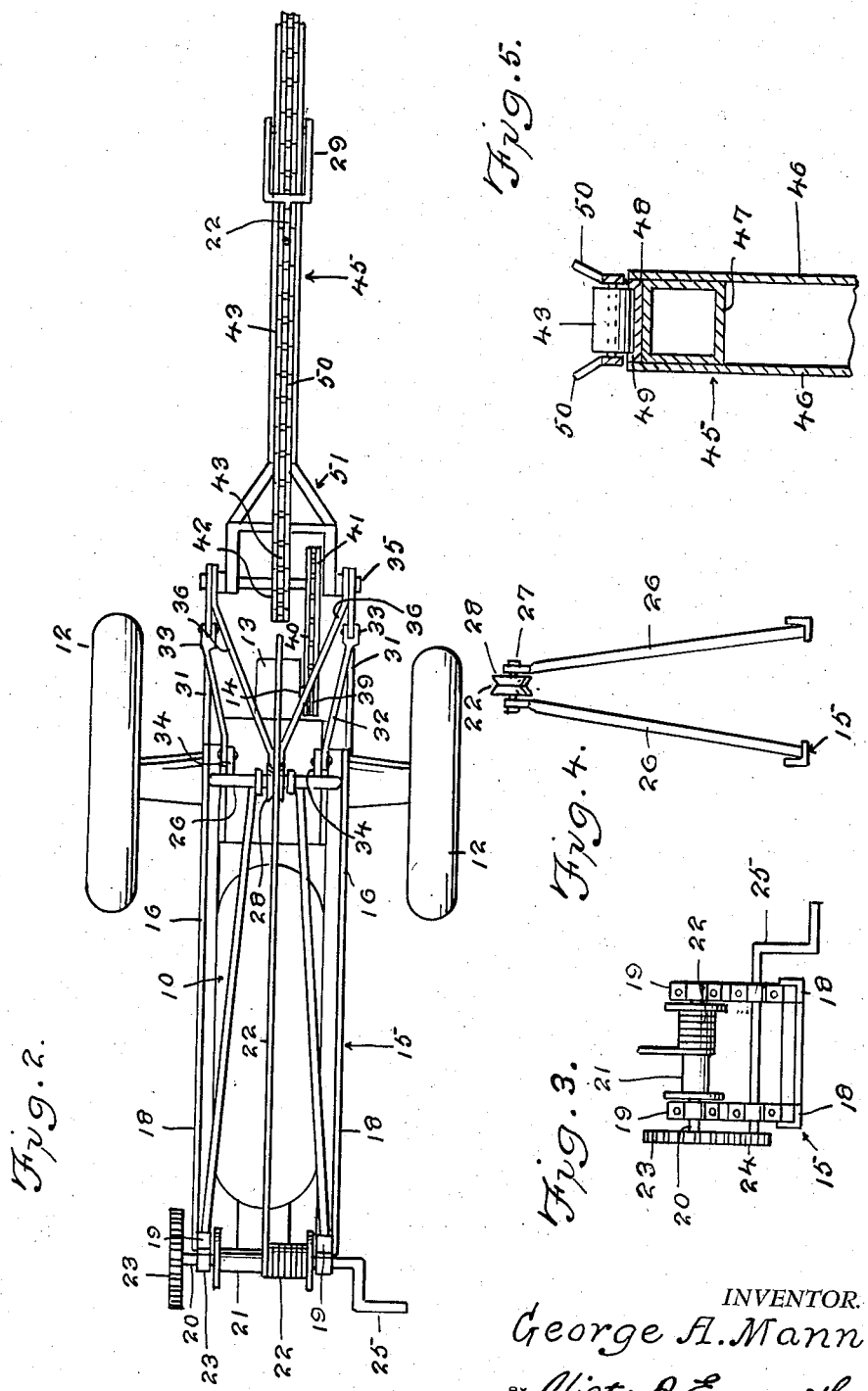
INVENTOR.
George A. Mann
BY *Victor J. Evans & Co.*
ATTORNEYS United States Patent Office 2,876,817
Patented Mar. 10, 1959

2,876,817

POWER HAYSTACK SAW

George A. Mann, Gothenburg, Nebr.

Application June 11, 1957, Serial No. 665,089

3 Claims. (Cl. 146—70)

This invention relates to a power saw, and more particularly to a power saw for use in cutting or dividing haystacks.

The object of the invention is to provide a power saw which is adapted to be used for cutting or dividing haystacks, the power saw of the present invention extending rearwardly from and being driven by a tractor.

Another object of the invention is to provide a saw which extends rearwardly from and is driven by a conventional tractor, whereby the saw can be used for various purposes such as dividing a haystack into two portions so that the portions can be more easily handled or transported as desired.

A further object of the invention is to provide a power driven saw which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a side elevational view, showing the saw of the present invention mounted on a tractor.

Figure 1a is a view similar to Figure 1, but showing a continuation of the saw.

Figure 2 is a top plan view showing the saw of the present invention mounted on the tractor, and with parts broken away and in section.

Figure 3 is a front elevational view showing the winch crank for turning the winch.

Figure 4 is a fragmentary elevational view showing the upright members for supporting the guide roller or pulley.

Figure 5 is an enlarged sectional view taken on the line 5—5 of Figure 1.

Referring in detail to the drawings, the numeral 10 designates a conventional tractor which includes the usual front wheels 11 and rear wheels 12, and arranged on the rear of the tractor 10 is a power take-off mechanism 13 which includes a shaft 14.

The present invention is directed to a saw which is driven by the tractor power take-off mechanism, and wherein the saw is adapted to be used for various purposes such as for dividing a haystack into two portions whereby the individual portions can be more easily handled or transported.

A means is provided for connecting the saw to the tractor 10, and this means comprises a supporting structure which is indicated generally by the numeral 15. The supporting structure 15 includes a pair of spaced parallel side members, and the side members are arranged on opposite sides of the body of the tractor 10. Each of the side members includes a first portion 16 which has an inclined portion 17 extending upwardly therefrom, and extending from the inclined portion 17 is a third portion 18, Figure 1.

Extending upwardly from the portion 18 of the supporting structure 15 is a pair of spaced parallel posts 19 which support a horizontally disposed shaft 20. A winch 21 is mounted on the shaft 20, and a cable 22 is trained over the winch 21. A gear 23 is connected to an end of the shaft 20, and a smaller gear 24 meshes with the large gear 23, the gear 24 being rotated by means of a manually operable crank 25.

Extending upwardly from the rear ends of the portions 16 is a pair of uprights 26, Figure 4, and a pin 27 extends between the upper ends of the uprights 26, the pin 27 serving to support a guide roller or guide pulley 28, the cable 22 being trained over the roller 28. A yoke or bracket 29 is connected to the rear end of the cable 22 for a purpose to be later described.

Extending rearwardly from the tractor is a pair of spaced parallel arms 31 which may be pivotally connected to the tractor by means of pivot pins 38. Levers 32 have one end connected to the arms 31 as at 33, while the other ends of the levers 32 may be connected to the tractor as at 34. Numeral 35 designates a driven shaft which is journaled in or supported by the rear ends of the arms 31, and a pair of links 36 extend upwardly from the shaft 35 and are connected to the tractor as at 37.

Connected to the power take-off shaft 14 is a sprocket 39, and an endless chain 40 is trained over the sprocket 39, the chain 40 being also trained over a sprocket 41 which is mounted on the driven shaft 35. Also mounted on the driven shaft 35 is a sprocket 42, and an endless chain 43 is trained over or arranged in engagement with the sprocket 42. The chain 43 is also trained over an idler sprocket 44 which is mounted in the rear end of the saw frame 45.

The saw frame 45 includes a pair of spaced parallel side walls 46, and as shown in the drawings, the saw frame 45 has an elongated oval shape so as to facilitate the cutting of haystacks or the like. The saw frame further includes channel members 47, Figure 5, and a trackway 48 which is provided with a groove 49 so as to provide a guide for the traveling chain 43. A plurality of teeth 50 extend outwardly from the chain 43 and are secured thereto, and the teeth 50 perform the cutting action as the chain 43 travels. An end structure or base 51 is secured to one end of the frame 45, and the base 45 is pivotally mounted on the shaft 35 whereby it will be seen that by turning the crank 25, the cable 22 can be wound on the winch 21 as for example when the saw frame 45 is to be pivoted about an axis extending through the shaft 35, the bracket 29 being connected to the saw frame 45 as shown in Figure 1.

From the foregoing, it is apparent that there has been provided a power saw which is especially suitable for use on farms or the like wherein haystacks can be readily cut or divided into different portions. In use, the tractor 10 is adapted to be operated in the usual manner, and with the tractor 10 operating, the power take-off shaft 14 can be driven. As the shaft 14 turns, it rotates the sprocket 39 which is mounted thereon, and this rotation of the sprocket 39 results in rotation of the sprocket 41 since the endless chain 40 is trained over the sprockets 39 and 41. The sprocket 41 is mounted on the shaft 35 which is journaled between the rear ends of the arms 31, and by means of the levers 32 and links 36, the arms 31 can be pivoted about the pivot pin 38, as for example when the apparatus is to be raised or lowered. Since the sprocket 41 is mounted on the shaft 35, it will be seen that rotation of the sprocket 41 will result in rotation of the sprocket 35 and this in turn will result in rotation of the sprocket 42 which is also mounted on the shaft 35. The endless saw chain 43 is trained over the sprocket 42 whereby the chain 43 will be turned in a clockwise direction, Figures 1 and 2, and since the plurality of teeth 50 are secured to the chain 43, it will be seen that the teeth 50 will exert a cutting action on the material such as the pile of hay.

The power driven saw further includes the frame 45 which has an elongated oval shape so as to permit large piles of hay to be cut or divided, and a trackway 48 may be supported by the frame 45 so as to help guide the traveling endless chain 43 which carries the teeth 50.

There is further provided the previously described means for pivoting the saw frame 45 about an axis extending through the shaft 35, and this means includes the crank 25. As the crank 25 is rotated, the gear 24 will turn and this in turn will turn the gear 23 which is mounted on the shaft 20. As the shaft 20 rotates, the winch 21 will be rotated whereby the cable 22 can be wound on or removed from the winch 21 and since the bracket 29 serves to connect the cable 22 to the saw frame 45, it will be seen that this rotation of the winch 21 can be used to effect a pivotal movement of the saw frame so that the saw can be moved to different positions as desired.

The parts can be made of any suitable material and in different shapes or sizes. As shown in Figure 5, the teeth 50 extend outwardly so that they will cut a path which is wide enough for the saw blade to descend in cutting without being pinched, and wherein the saw blade can be pulled endwise by moving the tractor forward. Thus, the blade can be pulled out of the stack endwise after the cutting has been completed. The cut must be wider than the chain track on the blade and wider than the pulley and bearing housing at the outer end of the saw. The saw cuts only vertically, and the great length of the frame 45 permits very little travel and a trailer can be used for carrying the tractor and saw blade as it is moved from field to field. The saw may utilize different types of chains, and the parts can be operated at different speeds. The members such as the levers 32 and links 36 may be hydraulically operated. The apparatus is constructed so that loose hay particles or foreign matter will not interfere with the movement of the chain. Thus, the use of the sheet metal side walls 46 prevents the loose hay or foreign matter from clogging the saw so as to insure that the saw will work efficiently. The teeth 50 are sharp and slope backwards from the direction of travel so as to provide the necessary cutting action, and by having the teeth 50 extend outwardly as shown in Figure 5, the saw will not become pinched between the ends of the two portions of the haystack which is made by the saw cut. The parts of the saw frame are preferably made of light weight material so as to prevent buckling of the parts. Also, the saw can be readily attached to the tractor without any material alteration to the tractor, and the saw frame can be lowered as when the entire assembly is being moved along a roadway or field. The elongated oval shaped frame helps insure that the chain 43 will remain in its proper position.

While I have shown a preferred form of my invention, I reserve all rights to such modifications as properly fall within thes cope of the invention as claimed

I claim:

1. In combination, a tractor, a power take-off shaft on the rear of the tractor, a supporting structure mounted on said tractor and including side members arranged on opposite sides of the tractor, each of said side members including a first portion which is horizontally disposed, an inclined second portion extending upwardly from said first portion, a third portion extending from said second portion, a pair of spaced parallel posts extending upwardly from the front end of said frame and secured thereto, a horizontally disposed shaft supported by said posts, a winch mounted on said last named shaft, manually operable means for rotating said last named shaft, a pair of upright members extending upwardly from the rear of said frame and secured thereto, a guide pulley supported between the upper ends of said uprights, a cable connected to said winch and arranged in engagement with said guide pulley, a pair of arms extending rearwardly from the tractor, levers extending upwardly from said arms and connected to said tractor, a driven shaft journaled between the rear ends of said arms, chain and sprocket means connecting said power take-off shaft to said driven shaft, links extending between said driven shaft and tractor, a frame arranged rearwardly of the tractor and including a pair of spaced parallel side walls, spaced apart channel members secured between said side walls and arranged adjacent the upper and lower portions thereof, a trackway arranged along the outer surface of the frame, an endless chain trained around said frame and engaging said trackway, a plurality of spaced apart teeth extending outwardly from said chain, a sprocket mounted on said driven shaft and engaged by said last named chain, an idler sprocket on the end of said frame engaged by said chain, and a base member secured to an end of said frame and pivotally mounted on said driven shaft.

2. In combination, a tractor, a power take-off shaft on the rear of the tractor, a supporting structure mounted on said tractor and including side members arranged on opposite sides of the tractor, each of said side members including a first portion which is horizontally disposed, an inclined second portion extending upwardly from said first portion, a third portion extending from said second portion, a pair of spaced parallel posts extending upwardly from the front end of said frame and secured thereto, a horizontally disposed shaft supported by said posts, a winch mounted on said last named shaft, manually operable means for rotating said last named shaft, a pair of upright members extending upwardly from the rear of said frame and secured thereto, a guide pulley supported between the upper ends of said uprights, a cable connected to said winch and arranged in engagement with said guide pulley, a pair of arms extending rearwardly from the tractor, levers extending upwardly from said arms and connected to said tractor, a driven shaft journaled between the rear ends of said arms, chain and sprocket means connecting said power take-off shaft to said driven shaft, links extending between said driven shaft and tractor, a frame arranged rearwardly of the tractor and including a pair of spaced parallel side walls, spaced apart channel members secured between said side walls and arranged adjacent the upper and lower portions thereof, a trackway arranged along the outer surface of the frame, an endless chain trained around said frame and engaging said trackway, a plurality of spaced apart teeth extending outwardly from said chain, a sprocket mounted on said driven shaft and engaged by said last named chain, an idler sprocket on the end of said frame engaged by said chain, a base member secured to an end of said frame and pivotally mounted on said driven shaft, said manually operable means comprising a crank, and intermeshing gear means connecting said crank to the shaft which supports the winch.

3. In a power driven saw, a supporting structure including a pair of spaced apart side members, a pair of spaced parallel posts extending upwardly from the front end of said supporting structure and secured thereto, a horizontally disposed shaft supported by said posts, a winch mounted on said last named shaft, manually operable means for rotating said shaft, a pair of upright members extending upwardly from the rear of said supporting structure and secured thereto, a guide pulley supporting structure and secured thereto, a guide pulley supported between the upper ends of said uprights, a cable connected to said winch and arranged in engagement with said guide pulley, a bracket connected to the rear of said cable, a driven shaft adapted to be connected to a power source, a frame arranged rearwardly of the supporting structure and including a pair of spaced parallel side walls, an endless chain trained around said frame, a plurality of spaced apart teeth extending outwardly from said chain, a sprocket mounted on said driven shaft and engaged by said chain, an idler sprocket on the end of said frame engaged by said chain, and a bracket on said cable being connected to said frame.

(References on following page)

References Cited in the file of this patent

UNITED STATES PATENTS

| | | |
|---|---|---|
| 834,251 | Bailey | Oct. 30, 1906 |
| 951,510 | Muir | Mar. 8, 1910 |
| 1,556,505 | Englerth | Oct. 6, 1925 |
| 2,284,919 | Nielson | June 2, 1942 |
| 2,521,323 | Baldwin | Sept. 5, 1950 |

FOREIGN PATENTS

| 151,800 | Australia | June 10, 1953 |
|---|---|---|